Figure 23:
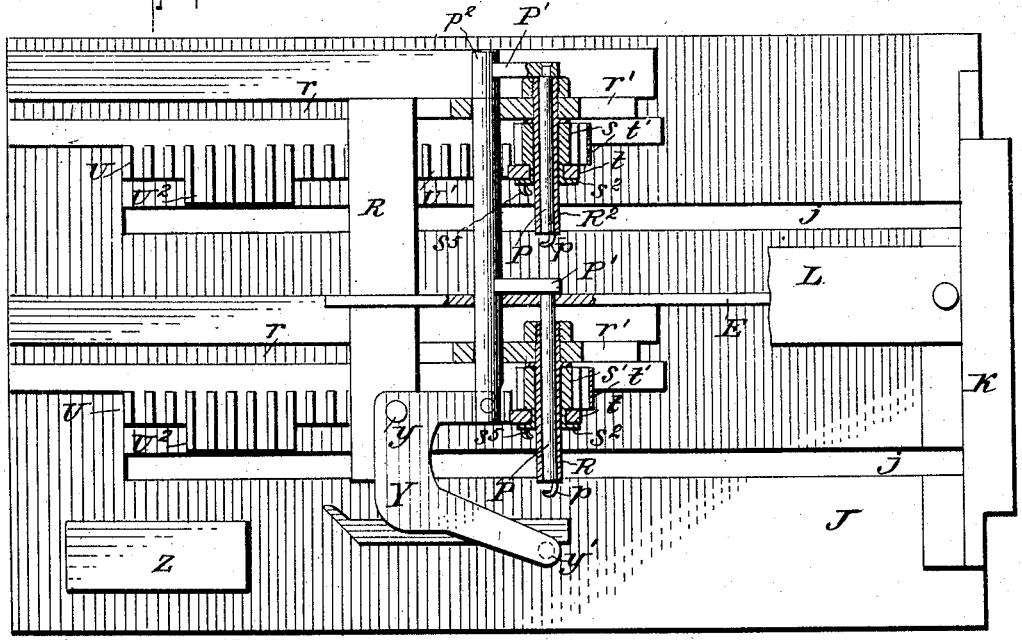

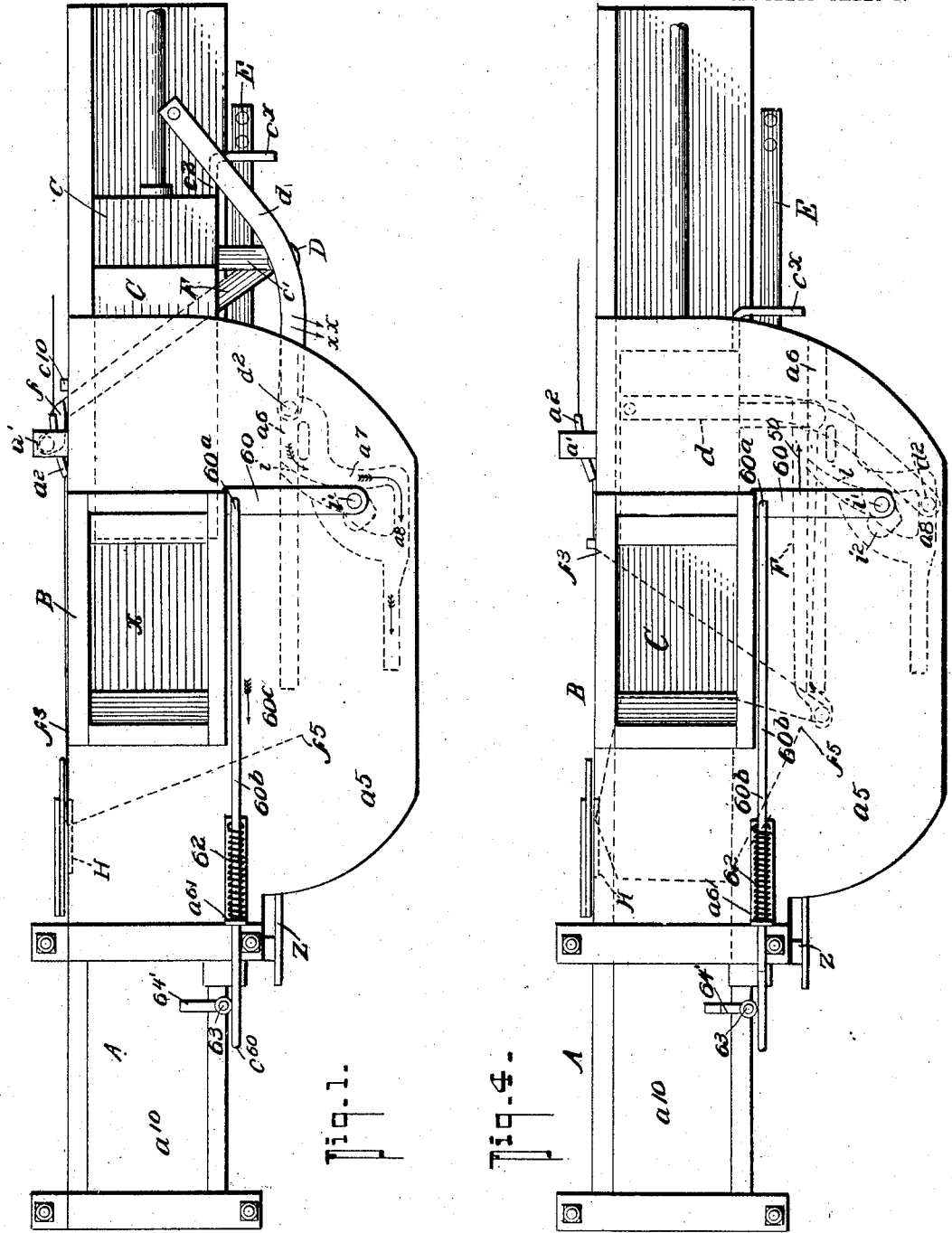

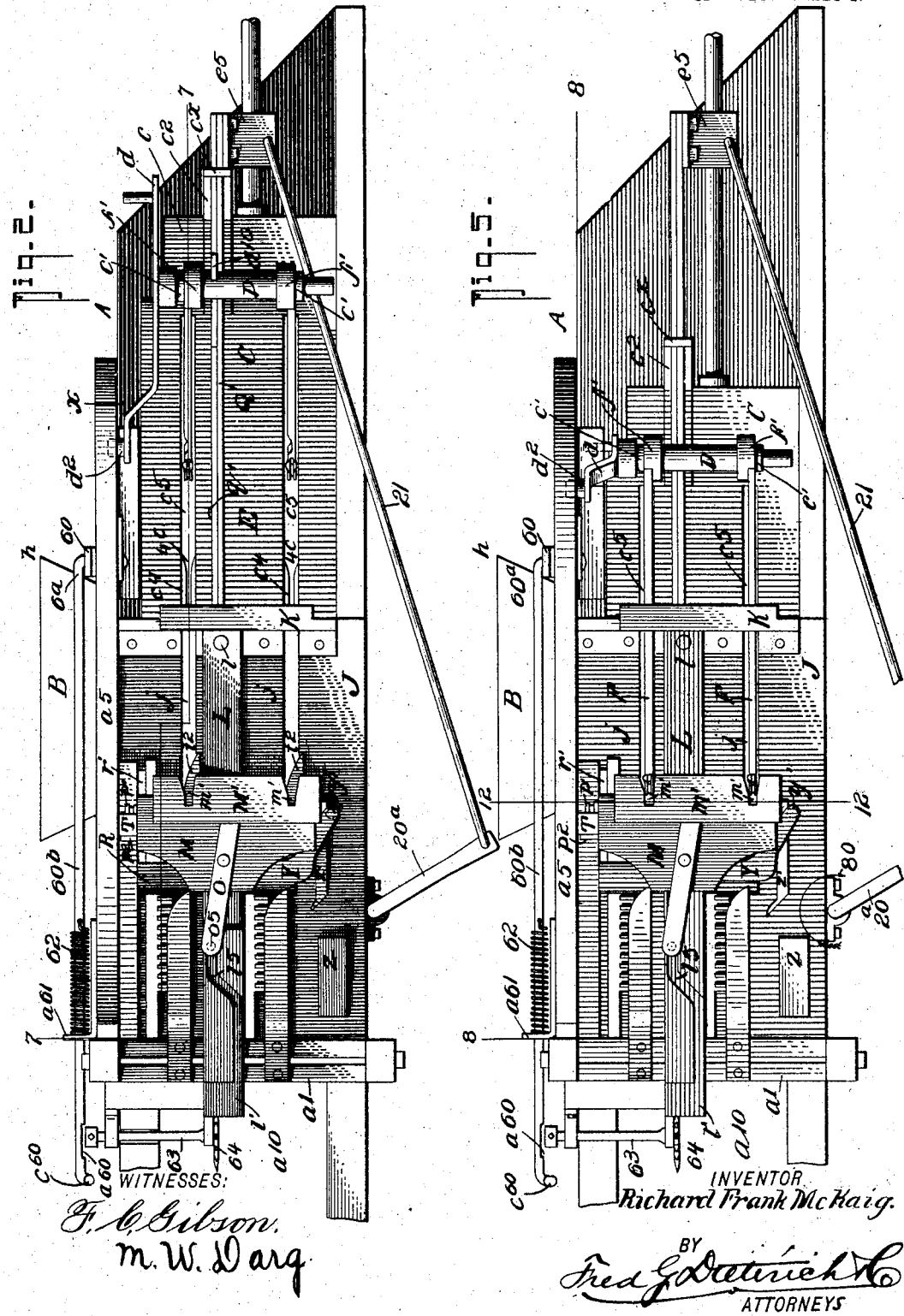

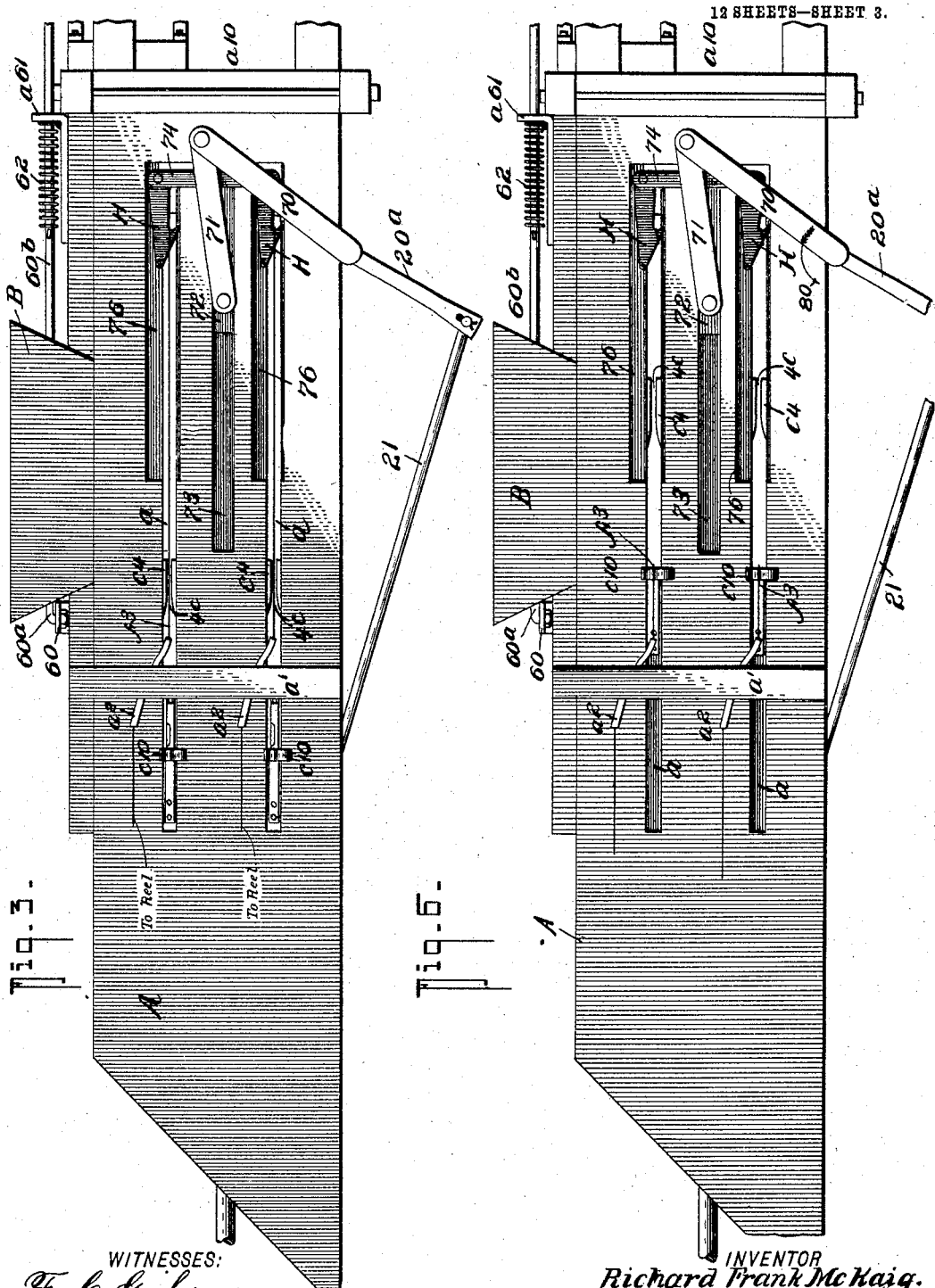

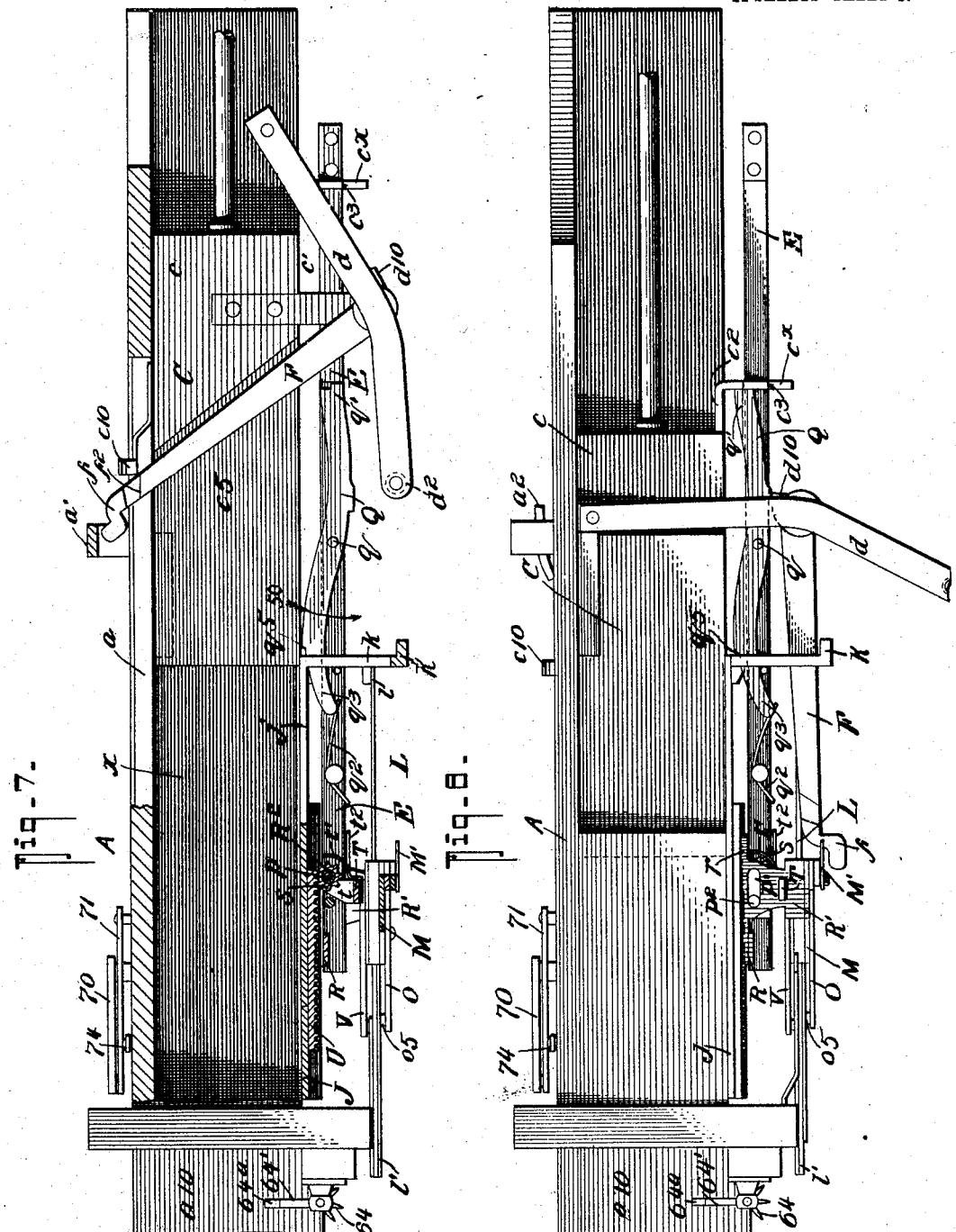

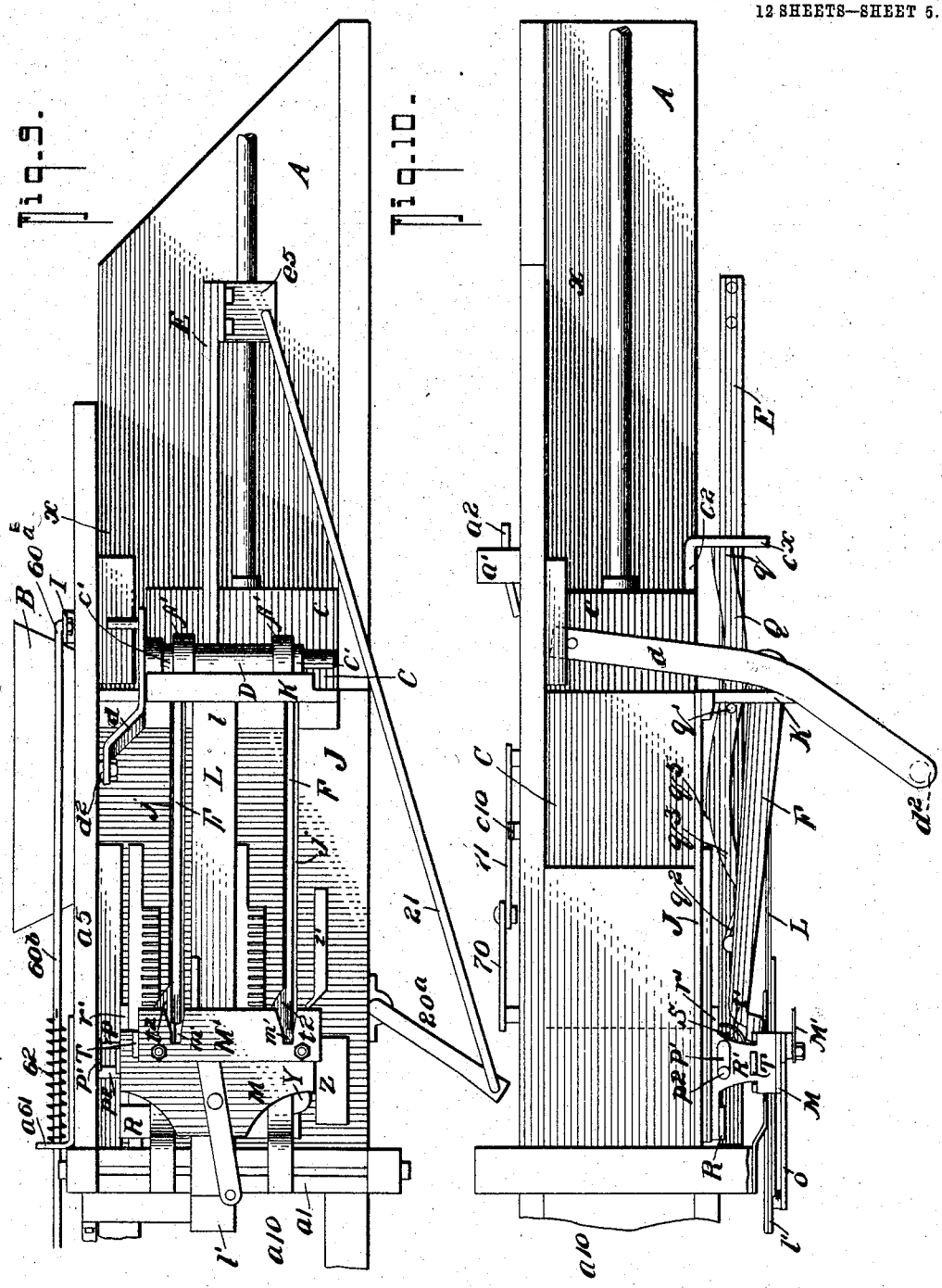

No. 790,071. PATENTED MAY 16, 1905.
R. F. McKAIG.
BALING MACHINE.
APPLICATION FILED FEB. 11, 1904.
12 SHEETS—SHEET 6.
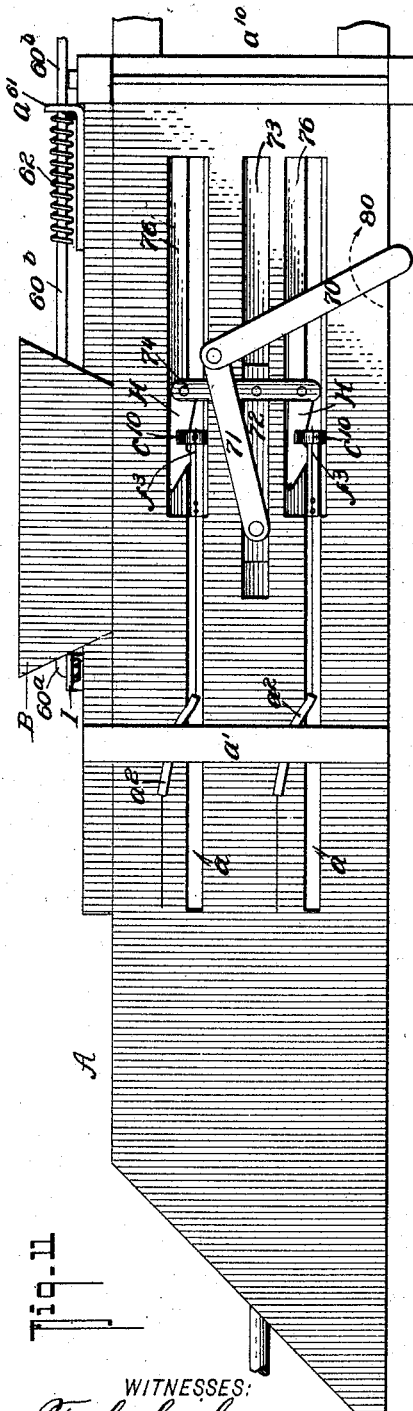
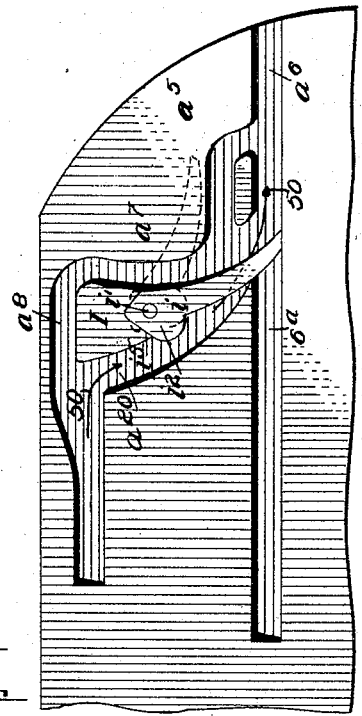
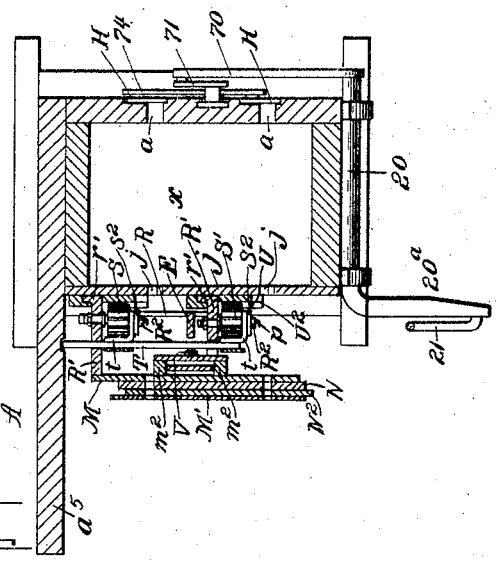
WITNESSES:
F. C. Gibson.
M. W. Darg.
INVENTOR
Richard Frank McKaig.
BY
Fred G. Dieterich & Co.
ATTORNEYS

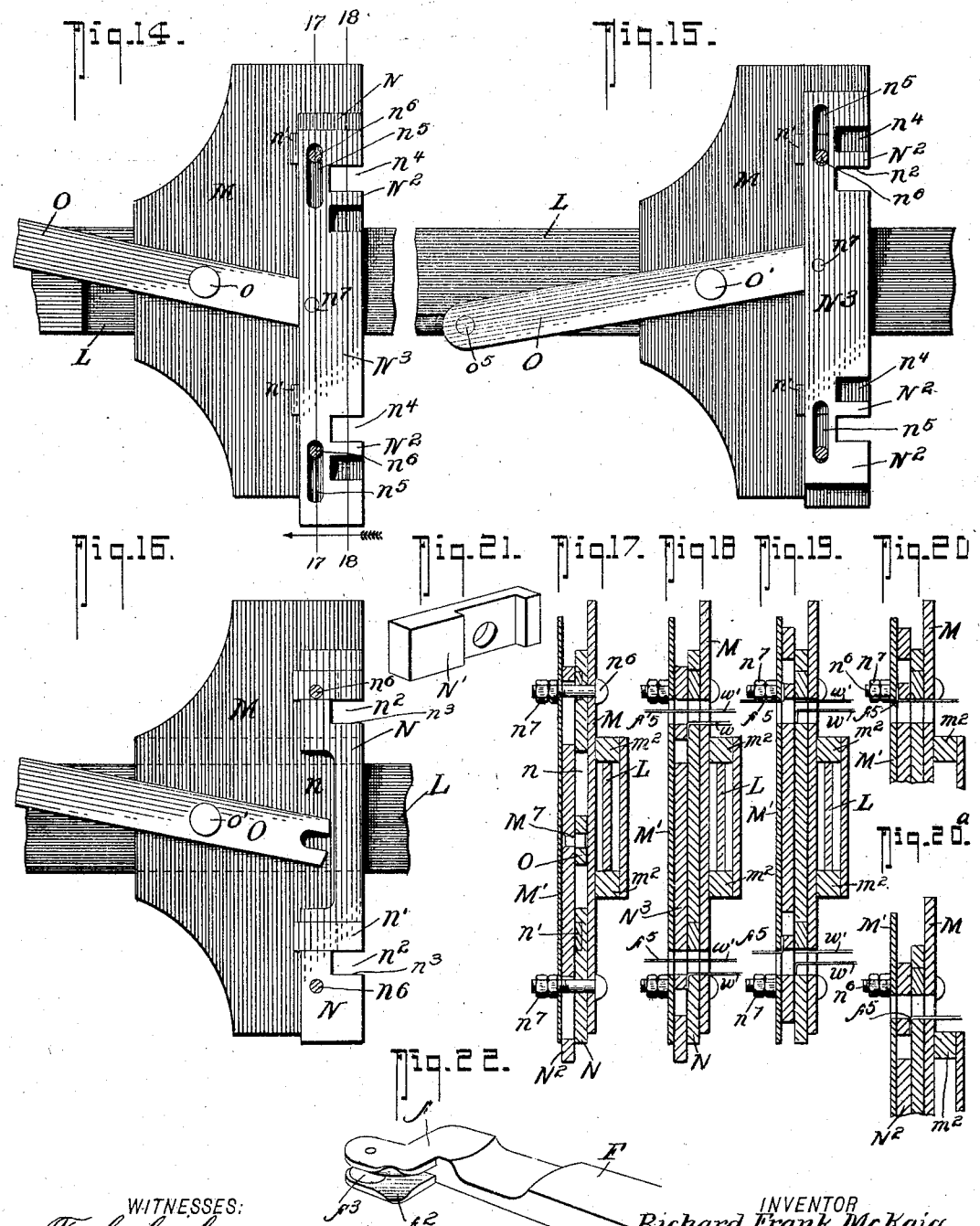

No. 790,071. PATENTED MAY 16, 1905.
R. F. McKAIG.
BALING MACHINE.
APPLICATION FILED FEB. 11, 1904.

12 SHEETS—SHEET 8.

WITNESSES:
F. C. Gibson.
M. W. Darg.

INVENTOR
Richard Frank McKaig

BY
Fred G. Dieterich & Co.
ATTORNEYS

No. 790,071. PATENTED MAY 16, 1905.
R. F. McKAIG.
BALING MACHINE.
APPLICATION FILED FEB. 11, 1904.

12 SHEETS—SHEET 9.

WITNESSES:
F. C. Gibson.
M. W. Darg.

INVENTOR
Richard Frank McKaig.

BY
Fred G. Dieterich & Co.
ATTORNEYS

No. 790,071. PATENTED MAY 16, 1905.
R. F. McKAIG.
BALING MACHINE.
APPLICATION FILED FEB. 11, 1904.
12 SHEETS—SHEET 10.
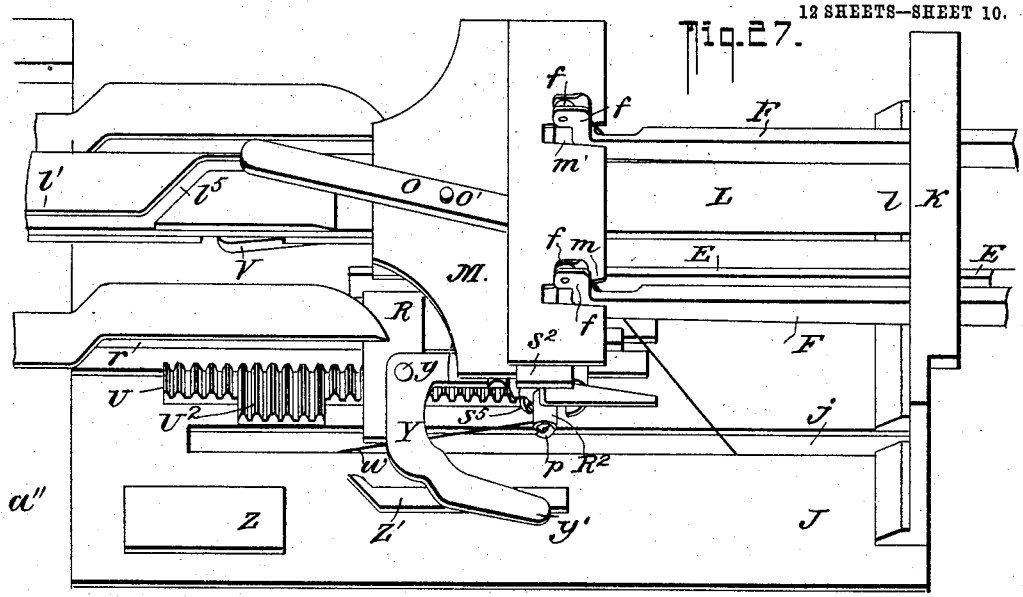
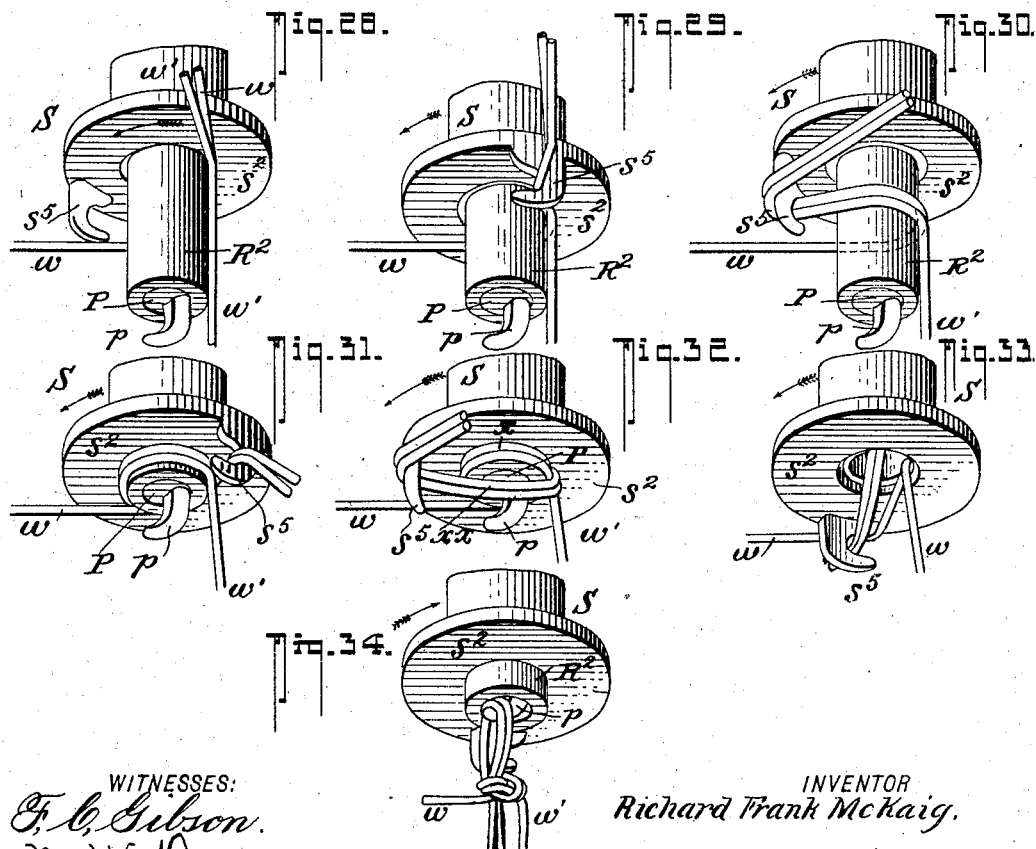
WITNESSES:
F. C. Gibson.
M. W. Darg.
INVENTOR
Richard Frank McKaig.
BY
Fred G. Dieterich
ATTORNEYS No. 790,071. PATENTED MAY 16, 1905.
R. F. McKAIG.
BALING MACHINE.
APPLICATION FILED FEB. 11, 1904.

12 SHEETS—SHEET 11.

WITNESSES:
F. C. Gibson
M. W. Darg

INVENTOR
Richard Frank McKaig

BY
Fred G. Dieterich & Co.
ATTORNEYS

No. 790,071. PATENTED MAY 16, 1905.
R. F. McKAIG.
BALING MACHINE.
APPLICATION FILED FEB. 11, 1904.
12 SHEETS—SHEET 12.
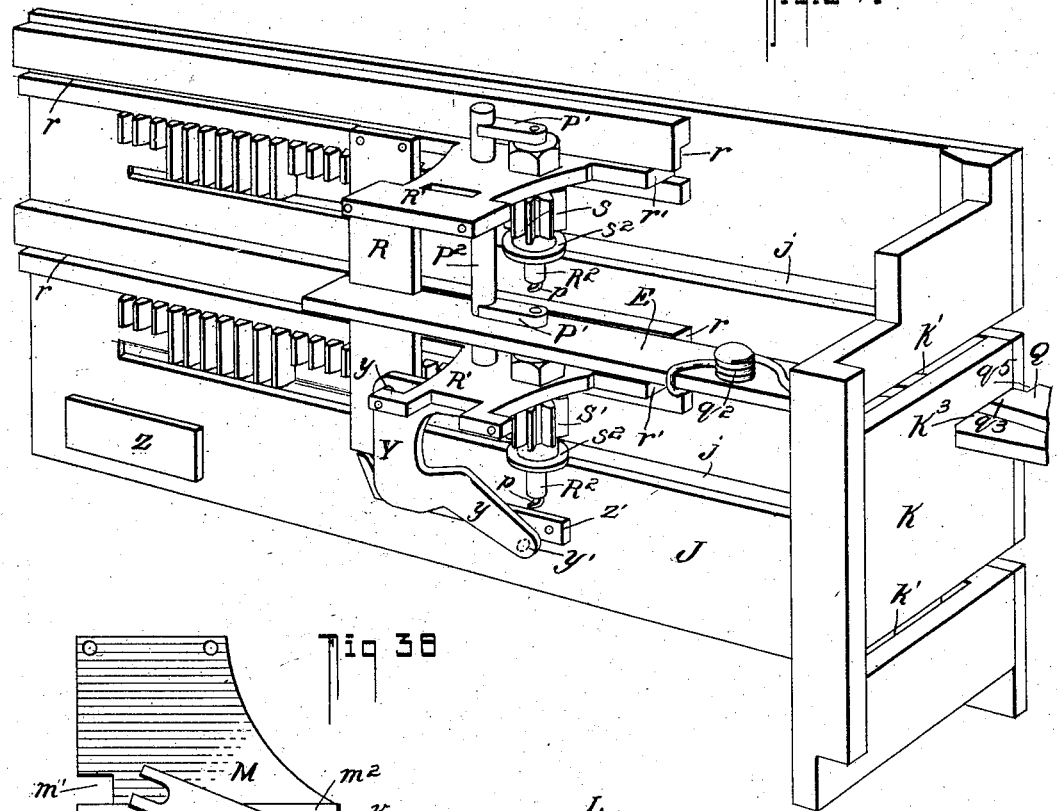
Fig. 37.
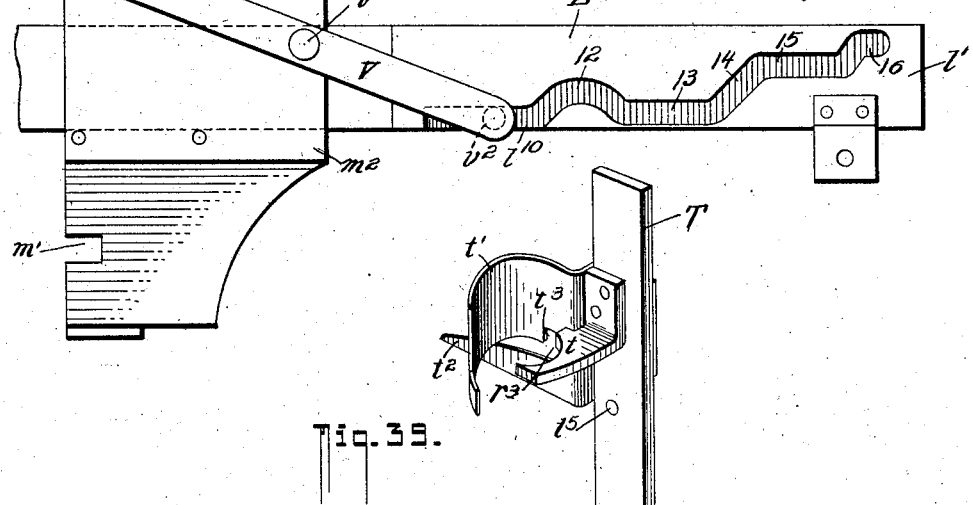
Fig. 38.
Fig. 39.
WITNESSES:
F. C. Gibson.
M. W. Darg.
INVENTOR
Richard Frank McKaig.
BY
Fred G. Dieterich & Co.
ATTORNEYS No. 790,071. Patented May 16, 1905.

UNITED STATES PATENT OFFICE.

RICHARD FRANK McKAIG, OF WEVER, IOWA.

BALING-MACHINE.

SPECIFICATION forming part of Letters Patent No. 790,071, dated May 16, 1905.

Application filed February 11, 1904. Serial No. 193,119.

*To all whom it may concern:*

Be it known that I, RICHARD FRANK MCKAIG, residing at Wever, in the county of Lee and State of Iowa, have invented a new and Improved Hay or Straw Baling Machine, of which the following is a specification.

My present invention seeks to provide an improved mechanism similar in its general features to that disclosed in my Patent No. 689,111, dated December 17, 1901, for wiring bales of hay or straw in power-presses adapted to be attached to or to coöperate with threshing-machines, so that all straw from the said machines can be conveniently and effectively baled as it is discharged therefrom.

In my patent referred to the operating mechanism has a special correlative arrangement and combination whereby the usual box or partition is dispensed with and means provided whereby as soon as the bale is completed the mechanism for tying or wiring the bale is moved into action, the bale immediately bound by drawing the wires around it, the ends of the tying-wire portion twisted and cut, and other wires brought into position to be engaged by the subsequent bale as the tied bale is projected into position to be removed.

My present construction generally comprehends an improved means for laying the wire around the bale-body automatically without the use of head-blocks in a simple and economical manner and whereby to tie the wire ends in a regular knot that cannot become loose or untied or slip off the bale, as is frequently the case when the wire ends are joined by twisting them only.

My present invention also embodies an improved arrangement of needles and actuating means therefor whereby to convey the wire through the bale-chamber with the least possible friction on the wire and for positively and accurately feeding the said wire into position to be engaged by the grip, twister, knotter, and severing means.

Another and important feature of my present invention lies in the improved means for holding the wire and for reeling the same off during the operation of carrying the wire over the bale and twisting and cutting it, whereby to minimize the danger of drawing the wire unduly tight during the operation of laying the same about the bale and conveying it to the grip-twister and cutting devices, and by which the wire is fed off the reel or holder one strand at a time.

This invention also provides an improved means for twisting and tying the wire ends after the same have been laid on the bale and for placing new strands across the baling-chamber that act as abutments for the material being baled and a means controlled by the movement of the bale for throwing into action at proper time the twisting, cutting, and severing means.

In its more subordinate features my present invention consists in certain details of construction and novel arrangement of parts that combine to produce a stable, easily-actuated, economical, and compact mechanism for the purposes stated, all of which will be hereinafter fully explained, specifically pointed out in the claims, and illustrated in the accompanying drawings, in which—

Figure 24:
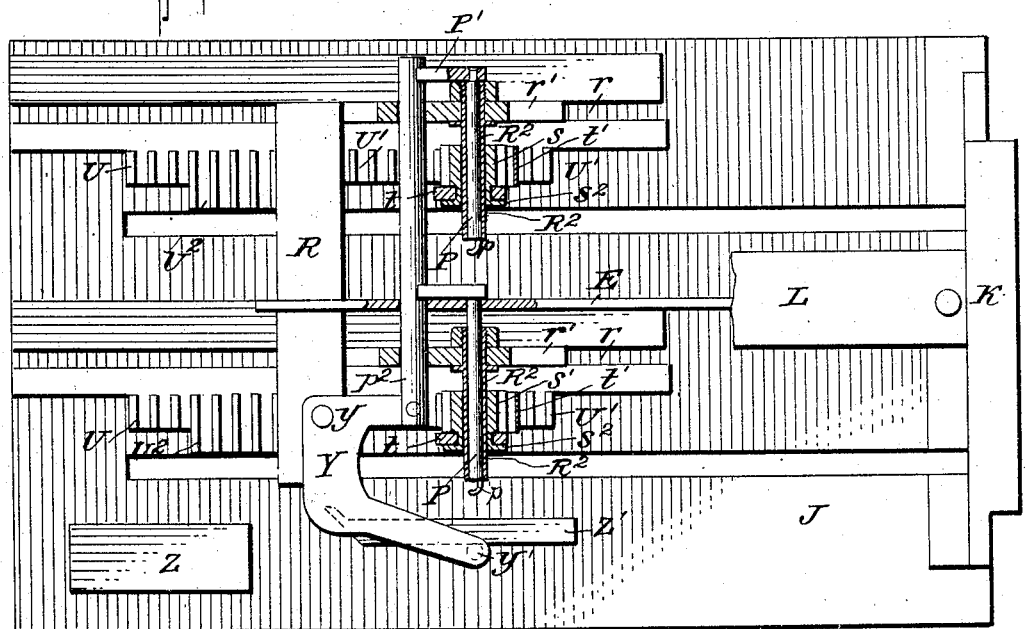
Figure 25:
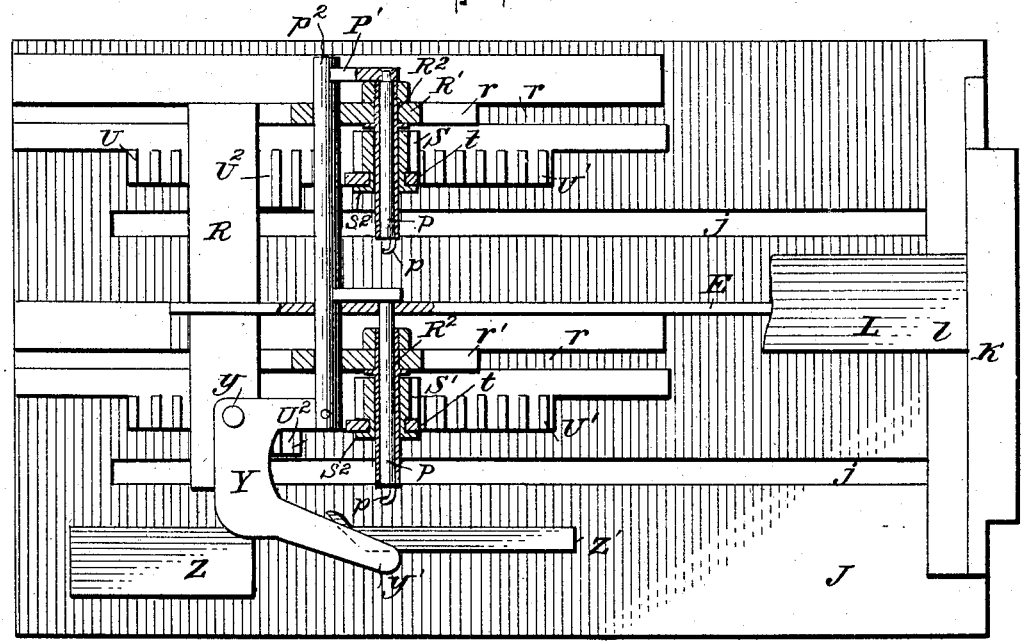
Figure 26:
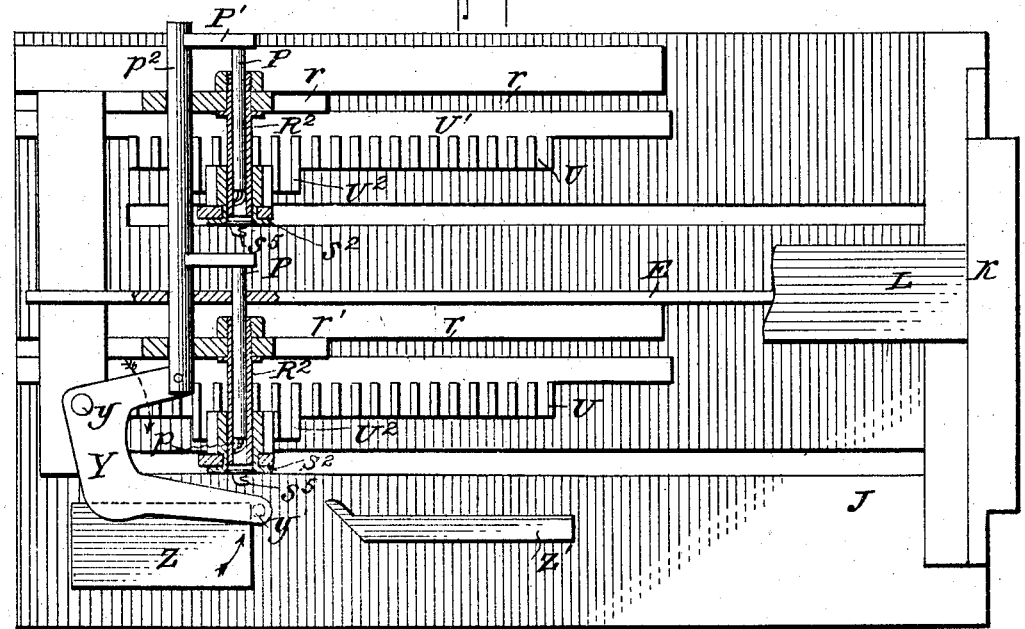
Figure 35:
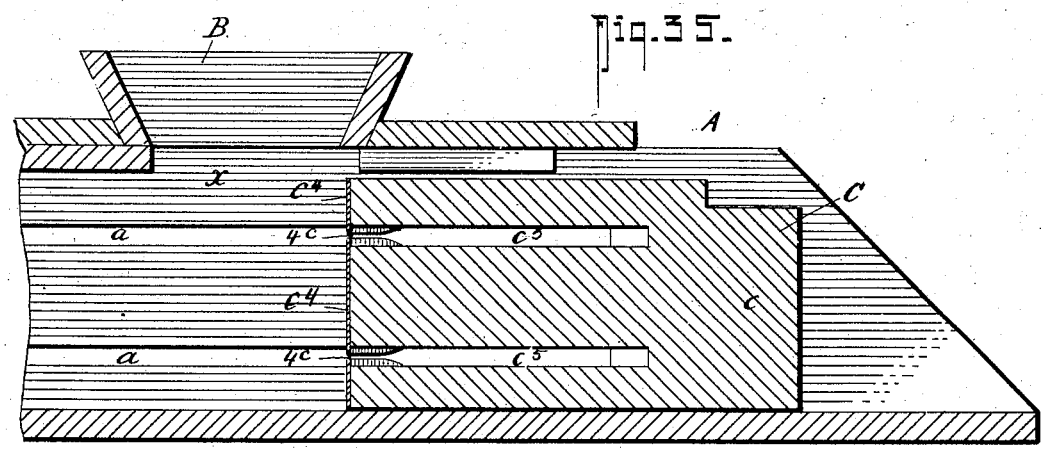
Figure 36:
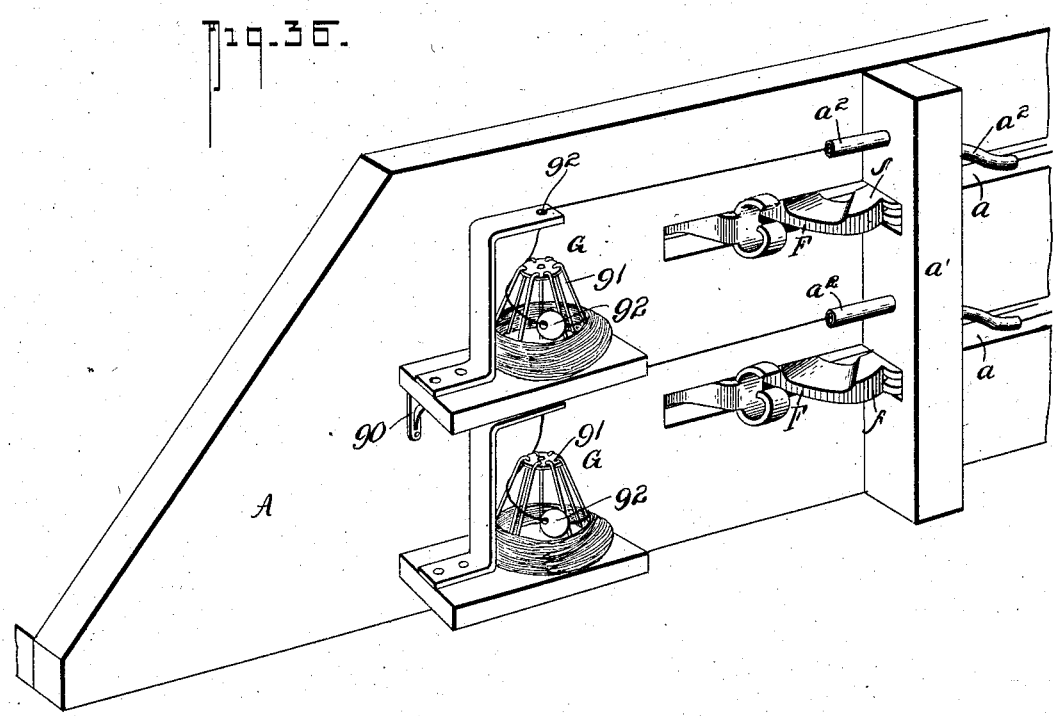

Figure 1 is a plan view of a portion of a hay-press with my improvements applied, the plunger being at its rearmost position, the switch devices that control the movement of the lever on the needle-arm-actuating rock-shaft being shown in dotted lines. Fig. 2 is a side elevation of the same, the parts being in the position shown in Fig. 1. Fig. 3 illustrates a similar view of that side of the machine opposite the side shown in Fig. 2. Fig. 4 is a plan view which illustrates the plunger at its bale-compressing position and the needle-arms swung over and as having carried a wire across the back of the bale. Figs. 5 and 6 are views of the opposite sides of the machine, the parts being in the position shown in Fig. 4. Fig. 7 is a horizontal section of the machine on the line 7 7 of Fig. 2. Fig. 8 is a similar view on the line 8 8 of Fig. 5. Fig. 9 is a side elevation of the press, the parts being in the position shown in Fig. 10. Fig. 10 is a plan view with the switch-holding frame removed. Fig. 11 is an elevation of the side opposite that shown in Fig. 9, the parts being in a like position. Fig. 12 is a cross-section on the line 12 12 of Fig. 5. Fig. 13 is an inverted plan view of the frame that carries the switch devices hereinafter referred to. Fig. 14 is a detail face view of the cross-head hereinafter referred to with the movable wire gripper and cutter member at its lowermost position. Fig. 15 is a similar view of the same, the gripper and cutter member being at its elevated position. Fig. 16 is a detail face view of the cross-head with the movable wire gripper and cutter member removed. Fig. 17 is a vertical section of the parts shown in Fig. 14, taken on the line 17 17. Fig. 18 is a vertical section on the line 18 18 of Fig. 14 and illustrates the manner in which the needle-carried end of the back wire $w'$ and the gripped end of the pivot-wire $w$ are held just prior to the cutting and releasing of said wire ends. Fig. 19 is a section taken on the line 18 18 of Fig. 14 and shows the position of the wire ends $w$ $w'$ after they have been cut. Figs. 20 and $20^a$ are similar sections showing how the end of the wires $w'$ are gripped after they have been drawn over to form the abutments or front wires for the next bale. Fig. 21 is a detail view of one of the removable wire-cutter blocks hereinafter referred to. Fig. 22 is a detail view of the outer wire-engaging end of the needle-bars. Fig. 23 is a front elevation of the rack devices for actuating the rotary wire knotter or twister gears and the means for elevating the removably adjustable knot-loop-making finger, the twister-gears being shown in section in their normal or elevated position. Fig. 24 is a similar view showing the twister and knotter gears at their dropped or second position. Fig. 25 is a front elevation of the same parts, the twister and knotter gears being at their (elevated) third position. Fig. 26 shows the said parts at their fourth or final position, the gears dropped, and the loop-lifter drawn up to release the knot. Fig. 27 is a detail perspective view of the cross-head M and its adjacent parts and illustrating the correlative position of the front and back wire portions $w$ $w'$ and the knotter and twister devices when the parts are in the position shown in Fig. 4. Fig. 28 is a detail perspective view of one of the wire twister and knotter devices, the parts being in the position shown in Figs. 23 and 27. Fig. 29 shows the position of the said devices when adjusted as shown in Fig. 24, the rotary twister and knotter finger at the said adjustment engaging the wire ends ready to carry them over as they are cut, which operation occurs when the movable gripper and cutter member moves to the position shown in Figs. 5 and 9. Fig. 30 illustrates the position of the rotary twister or knotter member when carrying the loose ends of the wires $w$ $w'$ over the main portions of the front wire $w$. Figs. 31 and 32 illustrate the position of the twister and knotter gear as the same is actuated to bring the wire ends in position to be engaged by the loop-drawing finger. Fig. 33 illustrates the position of the gear devices when the parts are adjusted as shown in Fig. 26. Fig. 34 illustrates how the tied knot is dropped and freed from the knotting devices. Fig. 35 is a longitudinal section of the plunger-head and the baling-chamber. Fig. 36 is a detail perspective view illustrating the general arrangement of the wire-coil-supporting means. Fig. 37 is a detail perspective view of the knotting mechanism hereinafter referred to. Fig. 38 is a detail view of that portion of the bar L having the cam-groove hereinafter referred to. Fig. 39 is a perspective view of the rotary knotting-head-supporting member.

In the application of my present invention A represents the casing of the baling-press of the type for which my improvements are provided, and B designates the hopper located over the baling-chamber X.

C designates the plunger or beater head, which is reciprocably mounted within the baling-chamber X and is actuated by any approved means, and in my present case the said head comprises a solid rear portion $c$, to which the actuating rod or pitman is attached and to which is also rigidly connected a pair of laterally-extended horizontal arms $c'$, which are disposed in a like vertical plane and form the bearings for the rock-shaft D, that actuates the needle-carrying arms presently again referred to.

$c^2$ designates a combined stop and shifter bracket-piece which is also rigidly secured to and movable with the plunger-head C and which includes a laterally-projected member $c^x$, having a slot $c^3$ to receive the longitudinally-extended bar E, the purpose of which will be presently explained.

The beater-head or plunger C has a solid top, and its front end is faced with a metal plate $c^4$, provided with a number of horizontal slits or wire-passages $4^c$, which extend across the full width of the said plate to register with a similar number of horizontally-disposed slits $c^5$ in the plunger-head that extends back to the solid rear end of the said head.

In the drawings but two slits $c^4$ and two corresponding slots $c^5$ are shown; but the number of the said slits and slots may be greater, if desired. In each of the slots $c^5$ operates a needle-arm F, the construction of which is best shown in Figs. 7, 10, and 22, by reference to which it will be noticed the two arms F are of like construction and are arranged to be operated in unison, and these arms, it should be here stated, are utilized to engage the tie-wires and carry them over the rear side of the bale and to bring the ends of that portion of the wire strand that passes over the rear of the bale into position to be engaged by the gripping, twisting, knotting, and severing mechanism which is mounted upon that side of the machine opposite the side where the needle ends of the arms F normally project.

To render the construction of my machine the more readily understood, I shall now describe in full the detailed arrangement of the needle-arms and the mechanism that actuates the same, after which I shall in proper sequence describe the wire gripping, twisting, knotting, and cutting mechanism.

Briefly stated, my improved mechanism feeds the wire strands into position across the front end of the baling-chamber to produce, as it were, stops or abutments against which the straw, &c., is pressed as the plunger-head is fed forward. During the operation of feeding the plunger-head forward the needle-arms will be actuated in such manner as to bring the wire strands over one side to the back of the mass, which has previously been crowded into a bale, and to bring the ends of that part of the wire strand that crosses the back of the bale into position to be gripped by other devices that carry the aforesaid side ends of the wires over the far side of the bale adjacent the corresponding ends of that part of the wire that crosses the front face of the bale and into a position where the two ends of the wire can be engaged by suitable twisting, knotting, and severing mechanism. After the wire is carried over the back of the bale further movement of the plunger forward causes the gripping, knotting, and severing means, hereinafter to be explained, to be thrown into action, which action is completed when the plunger reaches the limit of its forward thrust. On the return movement of the plunger-head the needle-arms, which are not now in engagement with the wire strands, return across the bale-chamber through the slots or openings in the plunger-head to the other side of the machine, and during this latter movement the mechanism at the side of the machine opposite the twister and knotter side engages the wire strands and brings the said several strands into an "abutment" position over the front part of the baling-chamber and also into position to be again engaged by the needle ends of the arms F.

The needle-arms F each consists of a curved portion $f$, having a hub $f'$ fixedly mounted on the rock-shaft D and of a length sufficient to make a sweep movement in a horizontal plane from the wire-feeding side of the machine across to the gripping and tying devices at the front side.

The outer end of each arm F terminates in what I consider a "needle-head," which consists of a portion bent forwardly at approximately right angles to the body of the arm F, and the said angle portion (designated $f$) has its outer end bifurcated and is formed in a manner substantially like that of the foot-section of the needles shown in my patent referred to.

At the inner edge each angle or foot portion $f$ has a V-shaped member $f^2$ to facilitate the engagement of the heel portion of the needle end of the arm F with the tying-wire and to guide the said wire into contact with the friction-roller $f^3$, mounted in the bifurcated end of the member $f$, as shown. When the arms F are at their rearmost position, which occurs when the plunger is at the limit of its rearmost thrust, the needle ends of the said arm F project through and beyond the longitudinal slots $a\ a$ in the casing A, which are disposed in a plane with the slots in the plunger-head, and the said heel portions are then located at a point just to the rear of the vertical braces $a'$ of the casing A, upon which is mounted a pair of tubular guides $a^2\ a^2$, one for each needle-arm, and each of which receives a wire strand from the stationarily-held wire-coil holder G, mounted adjacent to the machine and having a special construction, for reasons to be explained. The guides $a^2$ are disposed in such relation to the needle ends of the arms F that the wire strands which pass therefrom to the combined wire-holders and feeder-pawls H H (see Fig. 3) will be maintained in the proper position to be engaged by the said needle during the operation of swinging the arms F across the baling-chamber.

By referring now more particularly to Figs. 1 and 4 of the drawings it will be noticed wire strands are located across the front end of the baling-chamber X, and the said strands at their outer end are held by the grip devices at one side of the machine and by the pawls H on the opposite side of the machine, from whence the said wires pass back through the guides $a^2$ to the feed-coil G. The material having been packed into the chamber between the cross-wire at the front and the beater-head C, motion is imparted to the said head C to move it in a forward direction. As the said head travels forward the rock-shaft D moves with it, and during the said forward movement of the head C the shaft D is rocked to swing the arms F across the bale-chamber X, which operation is effected in the following manner and by the mechanism disclosed in dotted lines in Figs. 1 and 4 and in detail in Fig. 13, by reference to which it will be noticed a curved bar $d$ is fixedly mounted on the upper end of the shaft D, the movement of which in a horizontal plane rocks the said shaft D at predetermined times in reverse directions. The outer end of the bar $d$ carries a vertically-projected roller-stud $d^2$, adapted to coöperate with switch devices that are mounted upon the under side of the lateral extension $a^5$ on the top of the press-casing A.

As shown in dotted lines in Fig. 1, when the plunger is at its rearmost position the stud $d^2$ is at the rear end of the longitudinally-extended groove $a^6$ in the under side of the frame member $a^5$, across which projects the tongue $i$ of the switch-plate I, which is provided with a fixedly-connected shaft $i'$, that extends through the frame $a^5$ and forms a fulcrum for the said switch-plate I. When in the position shown in Fig. 1, the tongue $i$ forms one edge of the outwardly-extended groove $a^7$, that communicates with the groove $a^6$ and also with another longitudinally and forwardly extending groove $a^8$, presently again referred to. Now the parts being as shown in Fig. 1, at the beginning of the forward movement of the head C the roller $d^2$ moves forward in a plane parallel with the longitudinal axis of the head until the stud $d^2$ reaches the switch-tongue $i$. During the latter movement the rock-shaft does not turn and the arms F will move forward with the head C without changing their position. As the head C continues in its forward movement it compresses the material in front of it against the wire strands across the front of the chamber X, and at the same time the horizontally-movable bar $d$ by reason of its roller $d^2$ engaging with the switch I is swung outward in the direction of the arrow $x$ $x$, and thereby causes the rock-shaft to turn in a corresponding direction, so that when the roller $d^2$ reaches the position shown in Fig. 4—that is, at the extreme outer end of the switchway—the needle-arms F will have been swung across the baling-chamber X over the rear of the bale mass in front of the plunger-head C and the wire strands thereby drawn tightly over the back of the bale and carried to the point where the ends of the strands that pass over the front of the bale are gripped, such movement of the machine completing the loop of the tire-wires about the bale; but it should be here stated the operation of tightly drawing the tire-wires around the bale at this time is not completed.

So far as described the forward movement of the head C has caused the roller-bearing $d^2$ upon the bar $d$ to have taken the course indicated by the dotted arrow on Fig. 1, with the roller $d^2$ disposed within the groove $a^8$ back of the heel end $i^2$ of the switch-tongue $i$. The final forward movement of the plunger-head through the medium of its shifter member $c^2$ sets into action the wire gripping, twisting, and knotting mechanisms, the final operation of the knotter device being, however, not completed until the head C begins its backward or return movement.

By referring now more particularly to Figs. 2 and 5 of the drawings, it will be seen that at that side of the casing having the part $a^5$ is mounted an iron plate J, that extends from the point about in line with the rear end $h$ of the hopper to a point some distance forward of the said hopper and terminates at the rear end of the bale-receiving extension $a^{10}$ of the casing A, the sides of which are open to permit of the ready removal of the tied bale after it had been pushed into the said extension $a^{10}$ by the final forward movement of the plunger-head C. The plate J has slots $j$, that register with the wire and needle slots in the head C, and to the rear end of the plate J is fixedly secured a metal bracket K, that projects outwardly at right angles and is slotted at $k'$, through which moves the sweep or needle arms F F. Connected at one end, $l$, to the part K and at the other end, $l'$, to the vertical timber $a'$, that forms a part of the extension $a^{10}$, is a horizontally-disposed plate L, upon which is slidably mounted a cross-head M, the peculiar construction of which and its operative connection with the gripping, cutting, and knotting devices will be presently explained.

Assuming the several parts that constitute my complete machine to now be in the position shown in Figs. 4, 5, and 6, it will be noticed the heels of the needle-arms F are projected into the entrant end of V-shaped crotches $m'$ $m'$ in the vertically-disposed plate M', that is a part of the cross-head M and which also forms a part of the wire gripping and cutting mechanism, the general construction of which is clearly shown in Fig. 5 and in Figs. 14 to 20. When the parts are in the position mentioned, (see Fig. 4,) the free ends of the wire portions $w$, that go over the front of the bale, are gripped by the combined gripping and cutting devices which are mounted upon and travel with the cross-head M. The cross-head comprises, essentially, a base-plate M, to the inner face of which is riveted a pair of horizontal guide-pieces $m^2$ $m^2$, that engage with the upper and lower edges of the rail or guide-plate L, upon which the cross-head M slides, and upon the outer face, at the rear edge thereof, the plate M has a fixedly-connected vertically-disposed combined wire gripping and severing steel plate N, (see Fig. 16,) the front edge of which is cut out, as at $n$, to allow for a proper sweep movement of the rocking lever O, presently again referred to, and at the rear edge and in horizontal alinement with the sweep-arms F F the plate N has recesses $n^2$ $n^2$ for the passage of the wire strands therebetween and also to receive the detachable head-blades or cutter-blocks (see Fig. 21) that form the stationary shearing members with which the movable cutter or shearing members $N^2$ coöperate. The lower edge $n^3$ of the recesses $n^2$, in connection with the movable severing members $N^2$, form means for gripping the wire strands and temporarily holding the same, the reason for which will presently appear.

The movable shearing members $N^2$ are an integral part of the plate $N^3$, provided with a pair of recesses $n^4$ $n^4$ above and below each shearing member $N^2$ $N^2$. The upper and lower ends of each of the said recesses are alternately brought into register with the recesses $n^2$ $n^2$ in the plate N, and the said plate $N^3$ is also provided with a pair of elongated slots $n^5$ $n^5$, disposed in alinement for the reception of the guide-studs $n^6$, (see Figs. 14 and 17,) and the plate $N^3$ also has an inwardly-projecting stud $n^7$, that engages the forked end of the rocking lever fulcrumed at O' on the cross-head plate M. The rock movement of the lever O actuates the plate N³ at predetermined intervals and reciprocates it vertically to grip the free end of the wire strands on the down thrust of the said plate N³ and to cut the said free ends on the up thrust of the said plate N³.

The plate N³ is guided to move uniformly over the face of the plate n by the cap-plate M′, having the crotches m′ m′ hereinbefore referred to, and it also has apertures for the passage of the threaded ends of the studs n⁶, that receive the fastening-nuts n⁷ n⁷. By removing the plate M′ the plate N³ can be readily detached from the head-plate.

Referring now more particularly to Fig. 8, it will be noticed that upon the shaft D is fixedly mounted a cam $d^{10}$, that engages a long pawl or dog Q, pivotally mounted at q on the bar E to swing laterally with respect to the said bar E, whereby its rear end q′ is brought into position to be engaged by the bracket-piece $c^2$ on the plunger-head C. This latter adjustment of parts is effected when the sweep-arms F F have been swung over to the position shown in Figs. 4 and 5. The dog Q is normally held in a position to travel with the bar E through the slotted bracket C², that is secured to the plunger-head C by the spring $q^2$, that engages the heel $q^3$ of the said dog Q, as shown. To the forward end of the bar E is fixedly connected a vertical plate R, which is also fixedly connected to a pair of horizontally-disposed brackets R′ R′, provided with flanges r′ r′, that engage the horizontal guide-grooves r r in the metal face-plate J, and the said bar R and brackets R′ are reciprocated with the bar E when it is actuated by the reciprocal movement of the plunger-head, and the said reciprocal movement is imparted to the bar E in the following manner: After the plunger-head C has been moved forward a distance sufficient to bring the needle-arms F F to the position shown in Fig. 4 the member $c^2$ on the plunger engages the rear end of the dog Q, which is now shifted to bring its said rear end into position to be engaged by the member $c^2$ and with its heel portion swung in the direction of the arrow 50, (see Fig. 7,) so that its notch $q^5$ becomes disengaged from the bracket K and is brought into position to be passed freely through the slot $k^3$ in the said bracket K. The purpose of the notch $q^5$ in the member Q will be presently explained. When the dog Q is engaged by the member $c^2$, it causes the bar E, with its attached parts, including the cross-head and the wire twisting and knotting devices, to move forward, and it is during this forward movement that the operation of twisting and knotting the wire ends occurs.

By referring now more particularly to Fig. 13 it will be noticed that the groove $a^6$ forms, as it were, a continuation of the forward longitudinally-extended groove 6ª, in which the stud $d^2$ travels when the switch I is shifted to the position shown in dotted lines in Fig. 13.

The purpose of the groove 6ª is to permit of the forward travel of the arm d with the plunger-head C for packing straw in the baling-chamber without affecting the wire-actuating mechanisms, or, in other words, to permit the head C, reciprocating within the baling-chamber, to produce a bale of the desired density before applying the tire-wires thereon. It should be here stated that the switch I is automatically shifted to the position shown in dotted lines in Fig. 13 to provide for a clearance of the groove $a^6$ 6ª the full length thereof through the return movement of the plunger and the arms d, whose stud $d^2$ upon the return movement enters the curved guide-groove $a^{20}$ and engages the back edge $i^5$ of the switch, and by reason of such contact it moves the switch over to leave a clear passage for the stud $d^2$ back to the place of beginning in the groove $a^6$. The switch I when it is shifted automatically to the position stated is locked to such position until it is again automatically released, the latter movement being effected in the following manner: Upon the upper end of the stud $i'$ of the switch I is fixedly connected a short bar 60, with which pivotally connects one end, 60ª, of the rod 60ᵇ, that extends longitudinally forward and has at its outer end a notch $a^{60}$, which engages with the stop-bracket $a^{61}$ through an aperture 61ª, in which the free end of a rod extends and is slidable. The aforesaid rod 60ᵇ is normally forced in the direction indicated by the arrow 60ᶜ (see Fig. 1) by the coil-spring 62, which is disposed about and connected with the rod and is also connected with the bracket $a^{61}$, as shown, the function of the said spring 62 being to shift the rod 60ª when it is shifted in the manner presently explained to return the switch I across the groove 6ª, as shown in full lines in Fig. 13. The shifting of the rod 60ᵇ is effected by the discharge of the completely-tied bale into the extension $a^{10}$ of the frame. At the end $a^{10}$ of the frame portion is journaled a short vertical shaft 63, having a spurred or toothed wheel 64, fixedly held thereon, which is so disposed with relation to the baling-chamber that the bale as it is being discharged engages the wheel 64, and thereby turns the shaft 63. Upon the upper end of the shaft 63 is a crank-piece 64′, having a cam portion 64ª adapted when the shaft is turned to engage the bent end $c^{60}$ of the rod 60ᵇ to lift the said end, so that the notch $a^{60}$ is disengaged from the bracket $a^{61}$ to thereby allow the said rod 60ᵇ being shot forward by the spring 62, which operation resets the switch I to the position shown in full lines in Fig. 13.

As before stated, when the needle-bars assume the position shown in Fig. 4 the free end of the wire portions that pass over the front of the bale are firmly gripped between the fixedly-held gripping and shearing member N and the movable shearing and gripping plate N³, as best shown in Fig. 18, and that portion of the wire strands held in the heel members of the needle-arms F is in close proximity to the gripped portions of the front wires and in a position to be severed, such correlative position of the front and back wire portions being shown in Figs. 4, 18, 27, and 28. Assuming now the bracket member $c^2$, connected to the plunger-head C, to be just engaging with the rear end of the pawl or dog Q and the plunger C is moving forward, the knotting, cutting, and twisting mechanism is now set in operation. The said mechanism and its operation is best described as follows: Each bracket member R' R' has a pendent and fixedly-held sleeve $R^2$ $R^2$, that project down over and below horizontally-disposed cog-racks which are especially designed to be engaged by cog-gears S S', of which there is one for each needle-arm F, two being shown in the drawings. Each of the cog-gears S S' has knotting-fingers $s^5$ pendent from the annular rim or base portions $s^2$ of the gears S S', and the said gears S S' are respectively mounted to slide vertically on the sleeves $R^2$ $R^2$, as clearly shown in Figs. 25 and 26, and the said gears are each supported upon a separate bracket-piece $t$. The bracket-pieces $t$ project inwardly from the bar T, vertically reciprocal within guide-slots $r^3$ in the brackets R' R' in the manner presently explained, and the said bar T, which is shown in detail in Fig. 39, is also provided with semicircular guard or housing members $t'$ to prevent the wire ends from becoming entangled, and which also guide the said ends into a proper position to be engaged by the rotary knotter or twister gears S S', and the said bar T is also provided with rearwardly-projecting inclined guide-fingers $t^2$, which guide the needle-carried strands into a proper position adjacent to the front wire strands and in register with the guide-notches $t^3$ in the housing members $t'$, as shown.

A separate cog-rack is provided for each knotter-gear S S', and each of the said cog-racks comprises a narrow portion U', that extends forward a predetermined distance, where it merges with the widened portion $U^2$, which terminates at a short continuation U of the portion U'. The reciprocally-held bar T is actuated by means of a lever V, (see Fig. 38,) which is centrally fulcrumed, as at $v$, upon the inner side of the cross-head that slides on the guide-bar L, and the rear end of the said lever V is bifurcated and engages a stud $t^5$ on the outer face of the bar T, (see Fig. 12,) while the front end of the said lever is provided with a lug $v^2$, that rides in a compound-curved groove on the inner face of the bar L, as best shown in Fig. 38, and which groove comprises a straight portion $l^{10}$, a semicircular curved portion 12, a straight portion 13, an upwardly-straight portion 14, and a horizontal portion 15, that terminates with an abrupt upwardly and forwardly extending portion 16.
When the members have been shifted to the position shown in Fig. 4, the cross-head that carries the knotter, twister, and severing mechanism is in the position shown in Fig. 27, and at this time the gears S S' are just about to engage the entrant portions U' of the racks, and motion being now imparted to the cross-head by reason of the engagement of the dog Q and the bracket $c^2$ the gears S S' are rotated in the direction indicated by the arrow on Fig. 28, and during the beginning of the rotary motion of the said gears S S' they are moved downwardly by the rise of the bar T, which movement is effected by reason of the lug $v^2$ on the lever V engaging with the upward turn the curved portion $l^2$ of the groove 12 in the plate L, which causes the rear end of the lever V to swing down, thereby lowering the gears S S' to the position shown in Fig. 24 and sufficient to bring the fingers $s^5$ low enough to engage the adjacent disposed ends $w$ and $w'$ of the tire-wires. When the latter position of the gears is reached, the lug $v^2$ engages the straight portion of the groove 13 in the plate L to permit of the proper rotation of the said gears S S' in the horizontal plane shown in Fig. 25 until the fingers shall have carried the wire strands around the sleeve $R^2$ of the knotter devices to the position shown in Fig. 30. It should be here stated that when the gears S S' assume the position shown in Fig. 23—that is, when the fingers $s^5$ have engaged the two wire ends, one of which is gripped by the members N and $N^3$ and the other end held by the needle-arms—
the said wire ends are cut, the operation of which is effected as follows: On the front face of the bar L is an inclined groove $l^5$, (clearly shown in Figs. 2 and 5,) with which the lug $o^5$ on the forward end of the pivoted lever O engages, and when the lug $o^5$ engages the inclined portion of the groove $l^5$ the bifurcated end of the lever O (see Fig. 16) is swung up, and with it the combined gripping and severing plate $N^3$, which now assumes the position shown in Figs. 15 and 19, by reference to which it will be noticed the end of the wire $w$ that goes over the front of the bale is now twisted and that end of the wire $w'$ that goes over the back of the bale is now first cut by the shearing action of the plate $N^3$ over the plate or bar N, and the outer or needle engaging portion (designated $f^5$) is then gripped between the plate $N^3$ and the face-plate M'. After the gears S S' assume the position shown in Fig. 30 they will have traveled on the stationary racks to about the position shown in Fig. 25. During the movement of the gears S S' from the beginning of their rotary motion to the position shown in Fig. 30 the loop-making claw or finger $p$ remains in the position shown in Figs. 28 and 32, from which and Fig. 25 it will be noticed the said claws are projected below the lower end of their respective coacting gears S S' and are formed upon the lower ends of spindles P P, mounted in the sleeves $R^2 R^2$. The spindles P P have vertical movement within the sleeves $R^2 R^2$, and each spindle is pendently supported from the brackets P', that are made fast to the rod $p^2$, guided in and vertically movable through the brackets R' R', and the bar E, pivotally supported at the lower end on the bell-crank lever Y, fulcrumed at $y$ to the plate R on the framework and in such a manner that when rocked, as presently stated, it raises the rod $P^2$, and with it the spindles P. In the final forward movement of the cross-head, and by which the gears S S' are shifted from the position shown in Fig. 25 to that shown in Fig. 26, the cut ends of the strands $w$ and $w'$ are twisted about the sleeves $R^2 R^2$ in a manner best shown in Figs. 31 and 32, and during the said final forward movement of the cross-head the gears S S' are dropped by the shifting of the bar T through the action of the lever V to the lowermost point, (see Fig. 32,) so that the fingers $s^5$ carry the strands $w$ and $w'$ over the previously-made coil and over the loop-making claw or finger $p$.

The position of the knotting and twisting devices shown in Fig. 32 occurs just prior to the limit of the forward movement of the cross-head M, and during the last part of the said movement the roller-bearing $y'$ on the rear end of the lever-arm $y$ engages a stop $z$, which causes the bell-crank member Y to swing in the direction indicated by the arrow on Fig. 26, and thereby moves the spindles, with the claws $p$, upward within their respective sleeves $R^2 R^2$, and at the same time the claws $p$ pull that part of the strands designated $x\ x$ on Fig. 32 into a loop between the coils $x$, which loops are drawn in through the sleeves $R^2 R^2$, as shown, it being understood that as the fingers $s^5$ still draw on the wire strands in a horizontal direction while the loops are being drawn up in the sleeves $R^2 R^2$ the knot is thereby made, as shown in Fig. 34. Upon the return movement of the cross-head L the roller-bearing $y'$ on the bell-crank Y engages an inclined stop $z'$, (see Fig. 26,) that swings the lever Y to depress the spindle P and in consequence projects the claws $p$ below the sleeves $R^2 R^2$ to allow the knotted ends of the strands to pull off, thus finishing the tying operation.

Having thus described how the bale is tied, I shall now explain how the wire strands are set to be engaged by the next bale to be made.

On the return movement of the plunger-head C the cross-head M is also drawn back and the twister-gears are rotated reversely and raised and lowered through the medium of the cam-tracks and the lifter-bar mechanism; but the said movement on the reverse of the plunger-head C effects no further result than throwing off the tied or knotted ends of the wire. As the cross-head M starts back the end $f^5$ of the wire $w'$ is gripped by the members N and $N^3$, as shown in Figs. 18 and $20^a$, and the back wire $w'$ now assumes the position shown in Fig. 4 and extends diagonally across the bale-box, in which position, however, it is not affected by the backward swing of the needle-arms F F, except as hereinafter stated, which now become free of the said wire $w'$ and move across the bale-chamber X back to their normal position, and the said back wire strand $w'$ is drawn under tension by reason of the shoulder $f^2$ of the arm F pressing against the same as it swings back in the direction indicated by the arrow $10^a$ on Fig. 4. During the backward movement of the plunger-head C a rocking motion is imparted to the shaft 20, that is journaled transversely on the machine under the front end of the bale-chamber, (see Fig. 12,) and the said shaft 20 is actuated by the crank $20^a$, with which pivotally joins a long pitman-rod 21, the rear end of which connects with the bracket-piece $e^5$, which is pendently secured to the rear end of the longitudinally-reciprocal slide-bar E. As soon as the plunger-head begins to move backward and the bracket $c^2$ disengages the rear end of the dog or pawl Q the spring $q^3$ swings the said pawl back to the position shown in Fig. 7, so that the rear end thereof will now pass back freely through the slot $c^×$ in the member $c^2$ when the switch I is set out of operative position to allow for the free reciprocation of the plunger-head C for packing the straw and without actuating the wire-feeding arms F—that is, when the roller-bearing $d^2$ moves in the longitudinal slotway $a^6$ under the top member $a^5$. As the plunger-head C moves backward after the wire ends have been tied and cut, as stated, the roller-bearing end $d^2$ of the lever $d$ takes the course designated by the arrow 50 on Figs. 4 and 13 and returns to the position shown in Figs. 1 and 7, at which position the said lever $d$ and the arms F controlled thereby remain until the switch I is again shifted to project across the groove $a^6$, which occurs after the bale has been tied and pushed out into the extension $a^{10}$ of the press-box and engages the spur-wheel 64, the movement of which trips the rod $60^b$ for the purposes hereinbefore explained. When the plunger-head is moved back to near its limit, its bracket $c^2$ engages the member $e^5$, and thereby moves the rod E and the knotter and cutting devices connected therewith back to the normal or initial position. (Shown in Figs. 2 and 7.)

It should be here stated that upon the final forward movement of the cross-head M and the bar L, to which it is attached and which is carried forward by the bracket $c^2$ engaging with the pawl Q, the rock-shaft 20 is rocked in the directions indicated by the arrow 80 on Figs. 5, 6, and 11, the reason for which will be best explained by reference to Figs. 3 and 6, from which it will be seen that on the end of the rock-shaft at that side of the machine shown is fixedly held a crank-arm 70, the upper end of which pivotally joins with the link 71, the rear end of which pivotally connects to the horizontal member 72, that travels in the horizontal groove 73 in the adjacent side of the framing and which connects with the vertical bar 74, to the upper and lower ends of which are pivotally joined claw members H, that ride within the groove 76 and whose outer ends are beveled and are adapted to slip over and drop by gravity into engagement with the wire strands at the points designated $f^3$ on Figs. 4 and 6 and just in advance of the wire guides $c^{10}$, that project laterally from the plunger-head C, as clearly shown in Fig. 7, to which the strands pass over the guides $a^2\ a^2$. (See Figs. 3 and 6.) Assuming now the head C to have moved forward to its limit and the claws H as having tripped over and into engagement with the inner portions $f^3\ f^3$ of the wires, as shown in Fig. 11, as the head C moves back the rock-shaft 20 is then turned in the direction indicated by the dotted arrow 80 on Fig. 11, and the arm 70 is swung in the same direction, which movement draws the claw members to the position shown in Figs. 3 and 6, and as the free ends of the wire strands are at this time gripped at the point $f'$ the said wire strands are drawn over the bale-chamber X to the position shown in Fig. 1, ready to receive the next pack of the straw against them as the head C reciprocates in the chamber X.

To provide for readily feeding out the wire strands as the needle-arms F engage them without danger of breaking them, I provide the form of reel shown in Fig. 36, in which 90 designates brackets fastened to the side of the main frame, one of the said brackets being provided for each needle-arm F. Upon each bracket 90 is mounted a conical stand 91, upon which the wire is coiled and from which the wire ends pass up through apertured guides 92, that project over the apices of the stands 91, from which the wire ends pass to the tubular guides $a^2 a^2$. 93 designates ball-weights through which the wire passes and which serve to prevent the strands from entangling or interfering with each other. By providing the wire-stands and arranging them in the manner shown in Fig. 36 the wire is uncoiled one strand at a time without moving the coil bulk or body, and the weights 92 positively keep the strands separated as the wires are quickly jerked or pulled upon by the needle-arms. While I have shown the stands 91 as mounted on the main framing, I desire it understood that in practice they may be set upon the ground adjacent to the machine.

From the foregoing description, taken in connection with the accompanying drawings, it is believed the complete operation of my invention will be readily understood by those skilled in the art to which it appertains.

The operation is automatic throughout, and the parts are so combined and coöperatively arranged that head-blocks are not required and the labor of making bale-ties is entirely avoided, thereby saving the expense of one to two men in tying the wires.

In my invention the wire-ties are regularly made and the knot is so formed that it cannot become untied or slipped off, as is often the case in making twisted wire-knots. The construction of the needles is such that they carry a wire through the bale-chamber with the least possible friction on the wire, and the wires are taken off the coils one strand at a time without moving the entire coils.

While I prefer to employ the detail arrangement of parts that constitute my complete machine as shown and described, I desire it understood that the same may be readily modified or varied without departing from the spirit of my invention or the scope of the appended claims.

Having thus described my invention, what I claim, and desire to secure by Letters Patent, is—

1. In a baling-press of the character described, a plunger or beater head, and wire-manipulating needle-arms mounted to sweep across the beater-head to the baling-chamber, means for supplying the wire to the heads of the needle-arms, said means comprising a conical stand upon which the wire is coiled, and a device for separating the strands of the coil as they are drawn off the conical stand, as set forth.

2. In a baling-press of the character described, a plunger or beater head, wire-manipulating needles actuated by the plunger or beater head, means for supplying wire to the needles, a wire twisting and cutting mechanism controlled by the movement of the plunger or beater head, and arranged to receive the wire from the needles after it has been carried across the baling-chamber, the said twisting and cutting mechanism including members mounted to grip the end of the wire after it has been cut and released from the needle, and a means for drawing the gripped end of the wire across the baling-chamber as the needle returns to again engage with the wire that passes from the supply devices, as set forth.

3. In a baling-press of the character described; a plunger or beater head, a wire-manipulating needle mounted to sweep across the head of the baling-chamber, means for moving the needle, said means being actuated by the movement of the plunger, and a device for supplying the wire to the needle, the said device consisting of a support for the wire coil and disposed vertically with respect to the sweep movement of the needle, guides through which the end of the coil passes to the needle, a weight slidably mounted on the free end of the wire and adapted to maintain a separation of the uppermost ones of the wire coils mounted on the coil-support, as set forth.

4. In a baling-press as described, the combination with the plunger or beater head and the means for supplying the wire, said means being mounted at one side of the machine; of a wire-manipulating needle-arm which is mounted to swing in the horizontal plane across the baling-chamber, a rock-shaft to which the arm is attached, a crank-lever connected to the shaft, camways in the machine-framing with which the crank-lever coöperates, a switch that coacts with the said ways arranged to be engaged by the crank-lever upon the forward thrust of the plunger-head, the aforesaid crank-shaft being mounted on and movable with the plunger-head, a detent device connected with the switch and adapted to hold said switch to the position to which it is set by the forward movement of the rock-shaft crank-lever, and a trip device that co-acts with the said detent, said trip device being arranged to be engaged by the finished and tied bale as it is passed out of the baling-chamber and to release the detent whereby to permit the switch member to automatically return to its normal position, as set forth.

5. In a baling-press of the character described; a wire knotting and cutting mechanism actuated by the movement of the plunger and consisting of a rotary head having a gear member provided with a wire-engaging finger, a loop-forming member mounted on the head and having vertical movement independent of the said head, a reciprocally-mounted carrier on which the head is supported, racks with which the gear carrying the finger meshes, wire cutting and gripping members mounted upon the said carrier which coact with the knotter devices, a means for intermittently reciprocating the head and the loop-forming member, and a means for actuating the cutting and gripping members as the carrier is reciprocated, as set forth.

6. In a baling-press as described, the combination with the plunger, a wire-manipulating needle and a carrier reciprocally mounted at one side of the baling-chamber and adapted to receive the wire from the needle-head after the wire has been passed over the bale; of a rotary knotting-head which includes an actuating-gear having a twisting-finger, a wire-lifting finger that forms a coöperative part of the head and which has vertical movement independent of the twisting-gear, a support for the rotary head vertically reciprocable upon the carrier, a wire cutting and gripping means also mounted upon the carrier and which includes a vertically-reciprocable shearing and gripping member, and a means for actuating the rotary head, the lifting-finger, and the vertically-movable shearing and gripping member as the carrier is reciprocated, as set forth.

RICHARD FRANK McKAIG.

Witnesses:
  CHAS. F. WEHMEIER,
  JOHN BECK.